US009975487B2

United States Patent
Lewis et al.

(10) Patent No.: US 9,975,487 B2
(45) Date of Patent: May 22, 2018

(54) REAR VISION SYSTEM FOR A VEHICLE AND METHOD OF USING THE SAME

(71) Applicant: GM GLOBAL TECHNOLOGY OPERATIONS LLC, Detroit, MI (US)

(72) Inventors: Allan K. Lewis, Windsor (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 15/014,883

(22) Filed: Feb. 3, 2016

(65) Prior Publication Data

US 2017/0217368 A1    Aug. 3, 2017

(51) Int. Cl.
| | |
|---|---|
| *B60R 1/00* | (2006.01) |
| *B60R 11/04* | (2006.01) |
| *H04N 7/18* | (2006.01) |
| *B60R 1/12* | (2006.01) |
| *B60R 11/00* | (2006.01) |

(52) U.S. Cl.
CPC ............... *B60R 1/00* (2013.01); *B60R 1/12* (2013.01); *B60R 11/04* (2013.01); *H04N 7/183* (2013.01); *B60R 2001/1253* (2013.01); *B60R 2011/004* (2013.01); *B60R 2300/30* (2013.01); *B60R 2300/60* (2013.01); *B60R 2300/802* (2013.01)

(58) Field of Classification Search
None
See application file for complete search history.

(56) References Cited

U.S. PATENT DOCUMENTS

| | | | | |
|---|---|---|---|---|
| 8,013,720 | B2 * | 9/2011 | Oelrich ............... | G08G 1/0962 340/426.17 |
| 2003/0108222 | A1 * | 6/2003 | Sato .................. | H04N 7/183 382/104 |
| 2003/0214584 | A1 * | 11/2003 | Ross, Jr. ............ | B60R 1/00 348/148 |
| 2005/0128061 | A1 * | 6/2005 | Yanai ................ | B60R 1/00 340/435 |
| 2006/0125919 | A1 * | 6/2006 | Camilleri ........... | B60R 1/00 348/148 |
| 2007/0206835 | A1 * | 9/2007 | Abe ................... | H04N 7/181 382/104 |
| 2008/0266396 | A1 * | 10/2008 | Stein ................. | H04N 7/183 348/148 |

(Continued)

*Primary Examiner* — Kate Luo
(74) *Attorney, Agent, or Firm* — Reising Ethington, P.C.

(57) ABSTRACT

A rear vision system and a corresponding method for use with a host vehicle towing a trailer or other object. The rear vision system may include a rear facing camera, a vehicle-to-vehicle (V2V) unit, vehicle dynamic sensors, a navigation unit, a control unit, and an electronic display mirror. When the towed trailer obstructs the rear facing camera, the system and method look for unseen vehicles behind the trailer and use the V2V unit to gather information from these vehicles. This information is then used to generate a rendering that graphically depicts or represents the unseen vehicle, and the rendering is superimposed on top of the video output from the rear facing camera in the form of enhanced video output, which is then displayed on the electronic display mirror. Thus, the driver is able to "see" behind the obstructing trailer without the use of additional cameras installed on the trailer.

18 Claims, 3 Drawing Sheets

(56) References Cited

U.S. PATENT DOCUMENTS

| | | | |
|---|---|---|---|
| 2014/0336876 A1* | 11/2014 | Gieseke | G06F 3/005 701/36 |
| 2015/0061894 A1* | 3/2015 | Strassberger | G08G 1/161 340/901 |
| 2016/0119586 A1* | 4/2016 | Riad | H04N 7/183 348/148 |

* cited by examiner

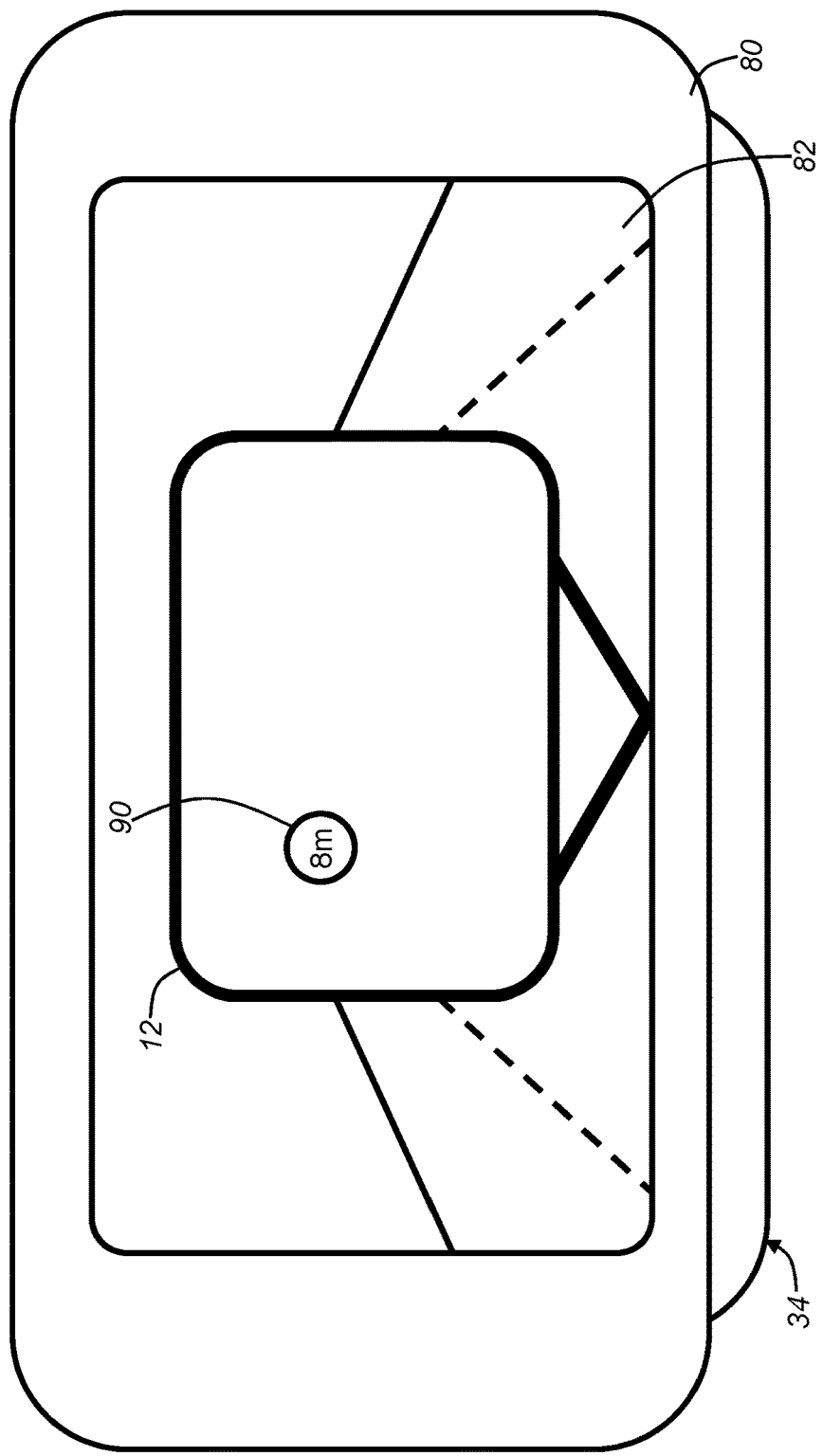

REAR VISION SYSTEM FOR A VEHICLE AND METHOD OF USING THE SAME

FIELD

The present invention generally relates to a rear vision system for a vehicle and, more particularly, to a rear vision system that replaces a traditional rear view mirror with an electronic display mirror.

BACKGROUND

Traditional rear view mirrors have been used in vehicles for a long time and, in recent years, they have been adapted to include a variety of electronic features such as auto-dimming features, built-in compasses, and integrated display screens, to cite a few examples. One of the newer developments involves the replacement of the traditional rear view mirror with an electronic display mirror that, instead of a standard mirrored surface, has an integrated electronic video display that is coupled to a rearward facing camera at the back of the vehicle and displays a video feed from the camera to the driver.

There are a number of reasons why an electronic display mirror may be preferable over a standard rear view mirror in certain vehicles. For example, current design trends tend to favor vehicles with beltlines and rooflines that result in small rear windows, and vehicle infotainment systems with drop-down screens and multi-row or tiered seating arrangements can block or otherwise obstruct a driver's view with a traditional rear view mirror. These, as well as other factors, can make it desirable to replace a standard rear view mirror with an electronic display mirror for certain vehicle applications.

One potential drawback of an electronic display mirror, however, occurs when the vehicle is towing a trailer that obstructs or blocks the rear facing camera. In this scenario, the electronic display mirror may be unable to show or alert the driver to the presence of a vehicle located behind the trailer (i.e., there may be one or more unseen vehicles in the camera's blind spot). The system and method described herein address this scenario.

SUMMARY

According to one aspect, there is provided a method of using a rear vision system for a host vehicle, where the rear vision system includes a rear facing camera, a vehicle-to-vehicle (V2V) unit, and an electronic display mirror. The method comprises the steps of: determining if a towed object behind the host vehicle is obstructing the rear facing camera; identifying an area of interest behind the host vehicle when the rear facing camera is obstructed; gathering information from a remote vehicle with the V2V unit; using the gathered information to determine if the remote vehicle is in the area of interest; generating a rendering of the remote vehicle when the remote vehicle is in the area of interest; and displaying the video output and the rendering of the remote vehicle on the electronic display mirror.

According to another aspect, there is provided a rear vision system for use with a host vehicle. The rear vision system comprises: a rear vision system control unit; a rear facing camera that is coupled to the control unit and provides the control unit with video output of an area behind the host vehicle; a vehicle-to-vehicle (V2V) unit that is coupled to the control unit and provides the control unit with traffic output relating to one or more remote vehicles; and an electronic display mirror that is coupled to the control unit and receives enhanced video output from the control unit. The control unit is configured to use the traffic output from the V2V unit to generate a rendering of an obstructed vehicle, to add the rendering of the obstructed vehicle to the video output from the rear facing camera so as to create the enhanced video output, and to provide the enhanced video output to the electronic display mirror.

DRAWINGS

Preferred exemplary embodiments will hereinafter be described in conjunction with the appended drawings, wherein like designations denote like elements, and wherein:

FIG. 3 is a schematic illustration of an exemplary electronic display mirror that may be used with the rear vision system of FIG. 1.

DESCRIPTION

Figure 1:
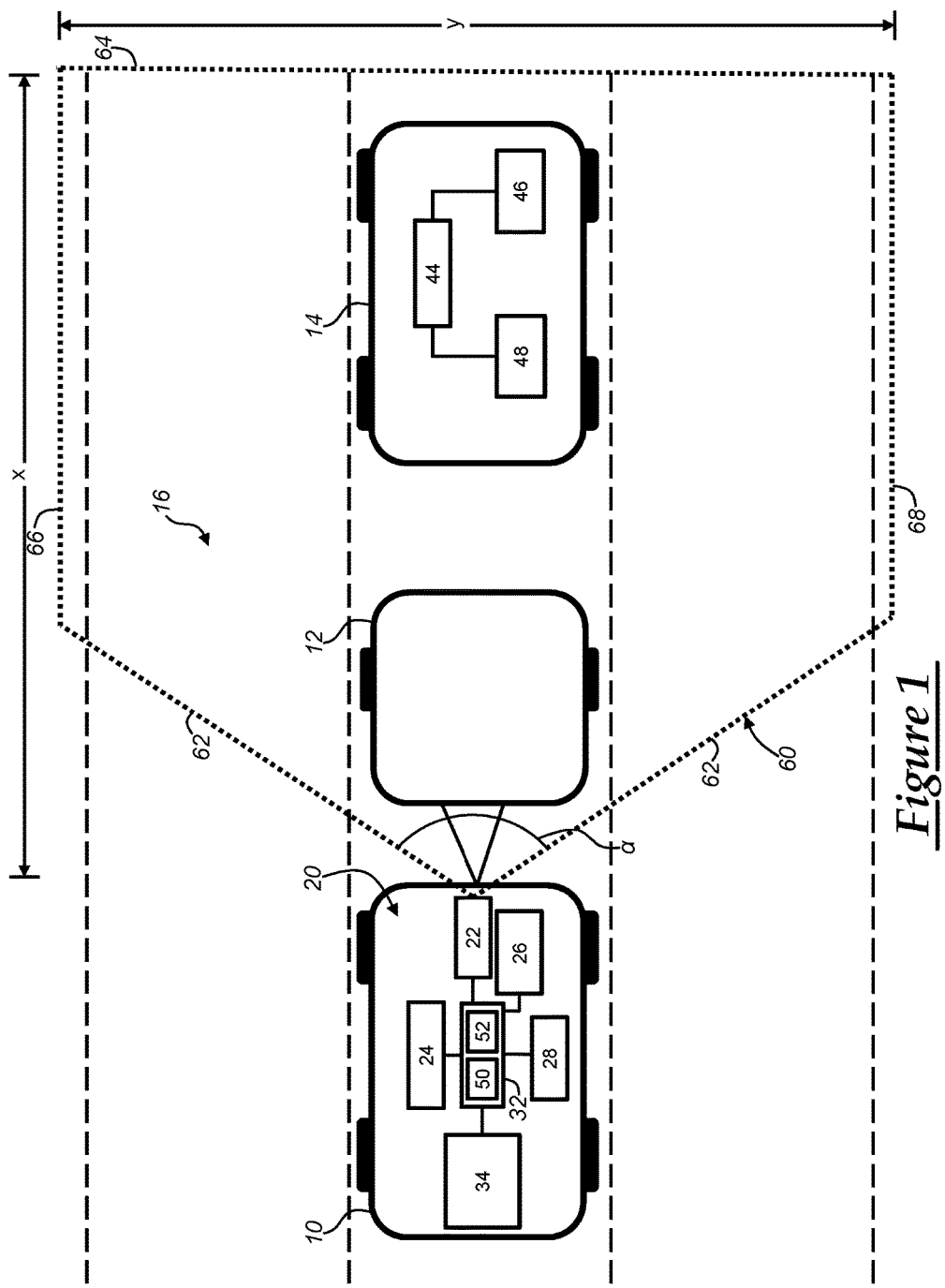
FIG. 1 is a schematic diagram of a host vehicle with an exemplary rear vision system that is towing a trailer, a remote vehicle is located behind the trailer and is obstructed from the rear vision system.

There is disclosed herein a rear vision system for a host vehicle and a method of using the same, where the rear vision system includes an electronic display mirror that is designed to replace a traditional rear view mirror. An electronic display mirror looks much like a traditional rear view mirror, except that instead of a standard mirrored surface, it has an integrated electronic video display that is coupled to a rearward facing camera at the back of the vehicle and displays a video feed from the camera to the driver in real time. As mentioned above, when a host vehicle with a rear vision system is towing a large trailer or other item that blocks or obstructs the rearward facing camera, the electronic display mirror is unable to show the area behind the trailer to the driver. An illustration of this scenario is shown in FIG. 1 and is described below. The present system and method are designed to overcome this challenge through the use of a vehicle-to-vehicle (V2V) system that gathers information from an obstructed or unseen vehicle, and a rear vision system that uses this information to generate a rendering or graphical representation of the unseen vehicle for presentation on the electronic display mirror. Furthermore, this can be accomplished without the use of additional remote cameras installed on the trailer itself, which adds unwanted cost, weight and complexity to the system.

Turning now to FIG. 1, there is shown a schematic illustration of a host vehicle 10 towing a trailer 12, where the host vehicle is equipped with an exemplary rear vision system 20 that includes a camera 22, a vehicle-to-vehicle (V2V) unit 24, vehicle dynamics sensors 26, a navigation unit 28, a rear vision system control unit 32, and an electronic display mirror 34. As seen, a remote vehicle 14 is traveling behind the trailer 12 and is in the same lane as the host vehicle 10 so that it cannot be seen by the camera 22 because of the obstructing trailer. The remote vehicle 14 is also equipped with a vehicle-to-vehicle unit 44, a variety of different sensors 46, and a navigation unit 48. As will be explained in the following paragraphs, the host vehicle 10 and the remote vehicle 14 may be part of a vehicle-to-vehicle (V2V) system 16 that enables nearby vehicles to communication with one another and, in this particular case, for the remote vehicle 14 to provide data regarding its position, speed, heading and/or other parameters to the host vehicle 10 so that it can be conveyed to the driver via the electronic display mirror 34.

Camera 22 is a rearward facing camera that is directed to an area behind the host vehicle 10 and provides the rear vision system 20 with video output to be displayed on the electronic display mirror 34. Camera 22, also referred to as a reversing camera or a rear view camera, may be of any suitable camera type (e.g., charge coupled device (CCD), complementary metal oxide semiconductor (CMOS), etc.) and may have any suitable lens known in the art so that it is not limited to any particular type, brand or model. According to one possibility, camera 22 provides video output where the images are horizontally flipped (i.e., they are the mirror image of the video originally captured by the camera). The horizontally flipped video output accounts for the fact that camera 22 and the driver are facing opposite directions and presents the video output on the electronic display mirror 34 in an orientation that is consistent with a traditional rear view mirror. Some non-limiting examples of potential embodiments or features that may be used with camera 22 include: infrared LEDs for night vision; wide angle or fish eye lenses; surface mount, flush mount, license mount, or side mount cameras; cameras integrated into tail lights, brake lights, or other components at the rear end of the vehicle; and wired or wireless cameras, to cite a few possibilities.

Vehicle-to-vehicle (V2V) unit 24 is a wireless communication device that enables host vehicle 10 to communicate with one or more similarly equipped and nearby vehicles according to the V2V system 16. The V2V unit 24, also referred to as a V2V radio or V2V module, provides rear vision system 20 with traffic output that may include data and information pertaining to nearby vehicles, such as remote vehicle 14. This information may also be used by different systems within the host vehicle 10, like autonomous and semi-autonomous driving systems, vehicle safety systems, vehicle warning systems, etc. According to one embodiment, the V2V unit 24 includes a suitable combination of hardware, software and/or applications configured to communicate with other vehicles over a short-range wireless network (e.g., dedicated short-range communications (DSRC) operating at a frequency of about 5.850-5.925 GHz and with a range of up to about 1,000 m). The V2V unit 24 may send and/or receive messages referred to as basic service messages (BSMs) according to a mesh network architecture, where every node (i.e., vehicle, smart traffic signal, etc.) can send, receive and/or retransmit messages. Skilled artisans will appreciate that V2V unit 24 may include any suitable combination of components and devices needed to carry out the method described herein, including a connected device like on-board equipment (OBE), an on-board unit (OBU), an aftermarket safety device (ASD), and/or a vehicle awareness device (VAD), to cite a few examples.

The basic safety message (BSM) is a standard message type and is designed to inform nearby vehicles of the position, dynamics and/or status of the transmitting vehicle. The BSM generally includes a Part I or core data set that is sent every 100 mSec or so, and a Part II or secondary data set that is optional and is sent less frequently. The Part I or core data set usually includes the following information: vehicle size, vehicle position (e.g., GPS coordinates), vehicle speed, vehicle direction of travel or heading, vehicle acceleration, brake system status, and time; whereas the Part II or secondary data set can vary and may indicate that the vehicle is braking hard or that ABS is activated, for example. More information regarding the BSM standard can be found in SAE J2735 BSM. It should be appreciated that while the exemplary system and method described below utilize the V2V system 16 to exchange BSMs between vehicles, this is not the only possibility. Any other suitable system, standard, protocol, etc. for automatically exchanging information and data between vehicles over an inter-vehicle wireless communication network could be used, and the system and method described herein are not limited to the aforementioned SAE standard or the examples below.

Vehicle dynamic sensors 26 provide the rear vision system 20 with sensor output that includes various readings, measurements, and/or other information that may be useful for carrying out the present method. For example, vehicle dynamic sensors 26 may include sensors or other components for measuring: wheel speed, wheel acceleration, vehicle speed, vehicle acceleration (longitudinal and/or lateral acceleration), yaw rate, other vehicle dynamics, as well as other sensors known in the art but not mentioned here. Sensors 26 can utilize a variety of different sensor types and techniques, including those that use rotational wheel speed, ground speed, an accelerometer, an inertial measurement unit (IMU), accelerator pedal position, gear shifter selection, engine speed, engine output, and throttle valve position, to name a few. Skilled artisans will appreciate that these sensors may operate according to optical, electromagnetic and/or other technologies, and that other parameters may be derived or calculated from these readings (e.g., acceleration may be calculated from velocity). Sensors 26 may be embodied in hardware, software, firmware or some combination thereof, and these sensors may directly sense or measure the conditions for which they are provided, or they may indirectly evaluate such conditions based on information provided by other sensors, components, devices, modules, systems, etc. It is possible for any of the various sensor readings described below to be provided by some other component, device, module, system, etc. in host vehicle 10 instead of being provided by an actual sensor element. It should be appreciated that the foregoing scenarios represent only some of the possibilities, as the present system and method are not limited to any particular sensor or sensor arrangement.

Navigation unit 28 provides the rear vision system 20 with navigation output that includes the location or heading of the host vehicle 10, road information, or a combination thereof. Depending on the particular embodiment, the navigation unit 28 may be a stand-alone component or it may be integrated within some other component or system within the vehicle. The navigation unit may include any combination of other components, devices, modules, etc., like a GPS unit, and may use the current position of the vehicle and road- or map-data to evaluate the upcoming road. For instance, the navigation signals or readings from unit 28 may include the current location of the vehicle and information regarding the configuration of the current road segment and the upcoming road segment (e.g., upcoming turns, curves, forks, embankments, straightaways, etc.). The navigation unit 28 can store pre-loaded map data and the like, or it can wirelessly receive such information through a telematics unit or some other communications device, to cite two possibilities.

Rear vision system control unit 32 acts as the main controller or control module of the rear vision system 20 and is at least partially responsible for performing or carrying out the method described below. According to an exemplary embodiment, the control unit 32 is coupled to camera 22 and receives video output, is coupled to V2V unit 24 and receives traffic output, is coupled to vehicle dynamic sensors 26 and receives sensor output, is coupled to navigation unit 28 and receives navigation output, and is coupled to electronic display mirror 34 and provides enhanced video output, although other combinations of devices may be coupled to the control unit instead. Control unit 32 may include any variety of electronic processing devices, memory devices, input/output (I/O) devices, and/or other known components, and may perform various control and/or communication related functions.

In an exemplary embodiment, control unit 32 includes an electronic memory device 50 that may receive and store any combination of the following items: video content from camera 22, information pertaining to nearby vehicles from V2V unit 24, sensor readings from vehicle dynamic sensors 26, position or heading data from navigation unit 28, look up tables or other data structures, algorithms (e.g., algorithms embodied in the exemplary method described below), etc. Memory device 50 may also store pertinent characteristics and background information pertaining to host vehicle 10, such as information relating to vehicle dimensions (e.g., weight, width and length), stopping distances, driver behavioral or historical data, particular sensor or camera locations and orientations on host vehicle 10, etc. Control unit 32 may also include an electronic processing device 52 (e.g., a microprocessor, a microcontroller, an application specific integrated circuit (ASIC), etc.) that executes instructions for software, firmware, programs, algorithms, scripts, applications, etc. that are stored in memory device 50 and may govern the methods described herein. Control unit 32 may be electronically connected to other vehicle devices, modules, and systems via suitable vehicle communications (e.g., a CAN bus or the like) and can interact with them when required. These are, of course, only some of the possible arrangements, functions and capabilities of control unit 32, as other embodiments could also be used.

Electronic display mirror 34 includes a video display integrated into the rear view mirror unit or housing so that the display shows the driver the video output from the rear view camera 22 in real time. According to the exemplary embodiment of FIG. 1, the electronic display mirror 34 is coupled to and receives enhanced video output from control unit 32. The electronic display mirror may utilize any number of different display technologies, such as a liquid crystal display (LCD) or a light emitting diode (LED) display. It should be appreciated that the system and method described herein may use any suitable type of electronic display mirror 34 and are not limited to any particular one. For instance, the electronic display mirror 34 may be a full display mirror (FDM) where the entire viewable surface of the device shows video from camera 22; it may be the type of electronic display mirror where only a portion of the display surface shows video from camera 22, whereas other portions of the display surface show other information (e.g., turn-by-turn or other navigation instructions, a compass or heading information, host vehicle performance data, etc.); it could have daytime and nighttime modes that adjust the brightness accordingly; or it could have a touchscreen so that users can make selections or otherwise input data, to cite a few of the possibilities. Instead of the electronic display mirror 34 being positioned in the traditional location of a rear view mirror (i.e., mounted to the front windshield at an upper, center location), it is possible for it to be part of a center consul infotainment or rear backup display or for it to be part of some other display.

Any of the devices 22-34 may be stand-alone, as illustrated in FIG. 1, or they may be incorporated or included within some other device, unit or module (e.g., the V2V unit 24 could be included within another vehicle communication module, some of the sensors 26 could be packaged in an inertial measurement unit (IMU), the navigation unit 28 could be part of a telematics unit, the control unit 32 could be integrated with the electronic display mirror 34 or an instrument cluster control module, etc.). Furthermore, any of the devices 22-34 may be dedicated, as depicted in FIG. 1, or they may be part of or shared by other systems or sub-systems in the vehicle (e.g., camera 22 and/or some of the sensors 26 could be part of an active safety system, an antilock brake system (ABS), or an autonomous or semi-autonomous driving system; the electronic display mirror 34 or the control unit 32 could be part of a vehicle infotainment system, etc.). The video output, traffic output, sensor output and/or navigation output from devices 22-28 may be directly provided to control unit 32 or indirectly provided through some other device, module and/or system, as is commonly known in the art. Similarly, the enhanced video output from control unit 32 may be directly or indirectly provided to the electronic display mirror 34. Accordingly, the devices 22-34 are not limited to the schematic representation in FIG. 1 or the exemplary descriptions above, nor are they limited to any particular embodiment or arrangement so long as they can be used with the method described herein.

The devices 44-48 in remote vehicle 14 may be similar to those with the same name that are already described above in conjunction with host vehicle 10. Thus, the aforementioned description of such devices applies to devices 44-48 as well and a duplicate description has been omitted.

Figure 2:
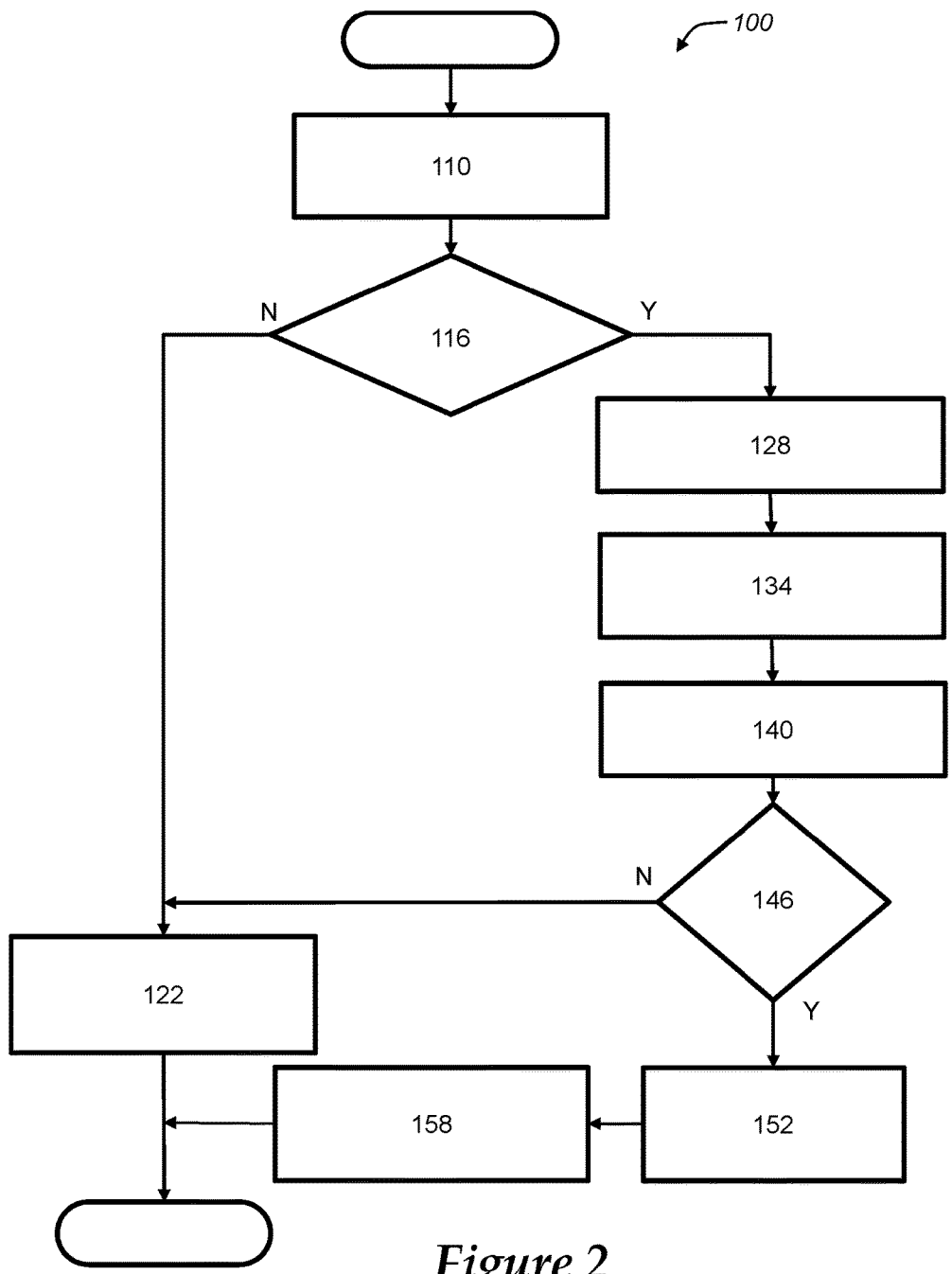
FIG. 2 is a flowchart of an exemplary method that may be used with the rear vision system of FIG. 1.

Turning now to the flowchart of FIG. 2, there is shown an exemplary method 100 for using a rear vision system, where the method depicts an unseen or obstructed vehicle on an electronic display mirror when a trailer or other towed object is blocking a rear facing camera. More specifically, the method uses a vehicle-to-vehicle (V2V) system 16 to gather vehicle position, speed and/or heading information from an obstructed vehicle 14 and then graphically depicts or represents the obstructed vehicle with a rendering 90 on the electronic display mirror 34 by superimposing the rendering overtop of the video output from the rear facing camera 22. Thus, the method enables the driver to "see" behind the obstructing trailer 12 without the use of additional cameras installed on the trailer.

Starting with step 110, the method determines if a trailer or other towed object 12 is obstructing the rear facing camera 22 and may do so according to a number of different techniques. For example, the method may use an image processing technique to analyze one or more images taken from the video output provided by the rear facing camera 22 and, based at least in part on this analysis, determine if a trailer or other type of towed 12 object is obstructing or blocking the camera. The image processing technique may be a multi-stage process that includes the sub-steps of: extracting and storing an image from the video output; applying Canny, HOG and/or other suitable filters to the stored image and storing the filtered image; evaluating the filtered image and identifying edges within expected regions that indicate the presence of a trailer (e.g., multiple trailer types may require a small database of test regions); waiting a predetermined amount of time (e.g., 3 sec); repeating the process a certain number of times or iterations (e.g., 5 iterations); evaluating the different filtered images for consistency within the boundaries of the trailer edges; concluding that a trailer or other towed object is indeed obstructing the rear facing camera 22 if there is sufficient edge consistency; and determining an obstruction angle α based on the geometric relationship between the camera 22 and the detected vertical edges of the trailer 12. At the conclusion of step 110, the method has preferably determined if the towed object is obstructing the rear facing camera 22 and has determined an obstruction angle α.

The Canny filter mentioned above may be carried out using some combination of the following sub-steps: apply a Gaussian filter to smooth the image and remove the noise; find the intensity gradients of the image; apply non-maximum suppression to remove spurious responses to edge detection; apply a double threshold to determine potential edges; and track one or more of the detected edges by hysteresis and suppress weaker edges that are not connected to stronger or more pronounced edges. In this way, the method can determined if a trailer or other towed object is obstructing a significant portion of the camera field-of-view and can help distinguish such a trailer from other objects in the background of the image. The Histogram of Oriented Gradients (HOG) filter mentioned above counts occurrences of gradient orientation in localized portions of the image, which is similar to edge orientation histograms, sale-invariant feature transform descriptors and shape contexts, except that it is computed on a dense grid of uniformly spaced cells and uses overlapping local contrast normalization for improved accuracy. The preceding Canny and HOG filters may be used together or separately. Skilled artisans will know of other suitable image processing techniques that may be used as well.

The image processing techniques of step 110 may be supplemented or substituted with other methods of detecting the presence of a trailer or towed object 12, however, this is optional. For instance, the present method may corroborate the findings of the image processing techniques described above by gathering readings from sensors directed to the area behind the host vehicle 10 (e.g., radar, laser, lidar sensors, etc.), by evaluating an electrical connection that couples the trailer electrical system to that of the host vehicle (e.g., electrical load detection on trailer brake light circuitry), or by assessing the ride height or weight distribution of the host vehicle to confirm that a towed object is indeed connected to a trailer hitch, to provide a few possibilities. These and other corroborating techniques may be used to simply confirm or verify the presence of a towed object 12 that has already been detected by an image processing technique, or they may be used in lieu of the image processing techniques to actually detect the towed object. Any of the techniques described in connection with step 110 may be wholly or partially carried out by the control unit 32.

Step 116 then directs the flow or sequence of the method based on the outcome of the previous step. If it was determined that the rear facing camera 22 is not obstructed by a trailer or other towed object 12, then the method may proceed to step 122 so that the video output from camera 22 can be displayed on the electronic display mirror 34 in the normal or typical fashion (i.e., without further enhancement of the video output by method 100). If, on the other hand, it was determined that the camera 22 is obstructed by a towed object 12, then the method may proceed to step 128. Steps 110 and/or 116 may consider what percentage or portion of the image from the video output is obstructed by the towed object 12 before deciding the outcome of step 116, and step 116 may be wholly or partially carried out by the control unit 32.

Next, step 128 identifies an area of interest 60 behind the host vehicle 10. The "area of interest," as that term is used herein, broadly refers to a region or zone that is located behind the host vehicle and, because of the trailer or towed object, is at least partially blocked or obstructed from the view of the rear facing camera. The area of interest 60 moves with the host vehicle 10 and is designed to encompass an area where the method may look for hidden or otherwise unseen vehicles, like remote vehicle 14. The size and shape of the area of interest 60 may vary depending on a variety of factors, such as the characteristics of the host vehicle (e.g., a different size and/or shape area of interest for a full size truck versus a medium size sedan), the size and shape of the obstructing object (e.g., a tall and wide trailer may dictate a larger area of interest than a shorter or narrower trailer), and host vehicle speed (e.g., a larger area of interest may be needed when the host vehicle is traveling at highway speeds versus slower speeds). Other factors may certainly be used to help determine or identify the boundaries of the area of interest 60.

With reference to the exemplary embodiment of FIG. 1, the area of interest 60 is generally shaped as a polygon and has a length X and a width Y. The length X extends from a vertex or intersection of first ends 62, which is generally aligned with the rear end of the host vehicle 10, to a second end 64 and may have any suitable distance, as dictated by factors such as those listed above (e.g., the length X could be 50 m, 100 m, 200 m, etc.). The obstruction angle α is the angle of the vertex where first ends 62 meet and is preferably determined back in step 110, although this is not necessary. The width Y extends from a first side 66 to a second side 68 and preferably encompasses one or more lanes of traffic, including the host vehicle lane (e.g., the width Y could be 5 m, 10 m, 20 m, etc.). In the non-limiting example of FIG. 1, the area of interest 60 has a length X of approximately 100 m and a width Y of approximately 15 m, which encompasses 3 lanes of traffic plus a small buffer so that width slightly extends beyond each adjacent lane. In other embodiments, the area of interest 60 may be of some other polygon shape, such as rectangular or other shape, or of no particular shape at all.

According to a non-limiting example of step 128, the control unit 32 identifies the area of interest by developing a coordinate envelope that is referenced or based off of the host vehicle 10 and helps define the area of interest 60. To explain, consider the situation in FIG. 1 where the host vehicle 10 is traveling on a highway and is pulling a trailer 12. At any given time, the position of the host vehicle 10 can usually be obtained from navigation output provided by the navigation unit 28 and a coordinate envelope can be developed based on the host vehicle position; that is, GPS coordinates can be used to define the boundary or perimeter of the area of interest, which is updated as the host vehicle is driven. Those skilled in the art will appreciate that additional tools, such as the use of dead reckoning and advanced map-enhanced driver assistance systems (ADASIS), may be used to further improve the accuracy or definition of such boundaries. For instance, dead reckoning parameters like steering angle, vehicle speed, and inertial data can be accumulated and recorded by the method so that the area of interest 60 can be better shaped to conform to the geometric contours of the road being driven.

Next, step 134 gathers information for all of the remote vehicles that are within range of the vehicle-to-vehicle (V2V) system 16. As explained above, it is possible for the V2V system 16 to utilize dedicated short-range communications (DSRC) with a range of up to about 1,000 m. In such an example, step 134 gathers information for each remote vehicle within a 1,000 m range, which can include vehicles ahead of the host vehicle, vehicles behind the host vehicle and within the area of interest 60 (e.g., remote vehicle 14), as well as vehicles behind the host vehicle that are not within the area of interest 60. According to one possibility, the V2V unit 24 receives a basic safety message (BSM) from each remote vehicle that is within range of the host vehicle 10 and is part of the V2V system 16, and from the BSM the method extracts information from the Part I or core data set, including vehicle position (e.g., GPS coordinates), vehicle speed, and/or vehicle heading. This information may then be provided from the V2V unit 24 to the control unit 32 in the form of traffic output. Of course, other information and data could be gathered as well, including a vehicle identifier for each remote vehicle.

Step 140 then determines which of the in-range remote vehicles are located within the area of interest 60. For example, the V2V unit 24 or the control unit 32 may review the vehicle position for each remote vehicle identified in step 134 and eliminate those located ahead of the host vehicle 10, as well as those located behind the host vehicle but outside of the area of interest 60. This may be done by comparing the GPS coordinates for each remote vehicle to the GPS coordinates that define the boundary of the area of interest 60, as well as comparing the vehicle headings of the host and remote vehicles. It is possible for a remote vehicle traveling in an opposite direction of the host vehicle 10 to momentarily pass through the area of interest 60, in which case the vehicle heading could be used to eliminate that remote vehicle from further consideration, even though its coordinates show that it being within the area of interest. According to the scenario illustrated in FIG. 1, step 140 would determine that remote vehicle 14 is within the area of interest 60 and would be identified as such.

Step 146 may then direct the flow or sequence of the method based on the outcome of the previous step. If it was determined that there are no remote vehicles within the area of interest 60 and heading in the same direction as the host vehicle 10, then the method may proceed to step 122 so that the video output from camera 22 can be displayed on the electronic display mirror 34 in the normal or typical fashion (i.e., without further enhancement of the video output by method 100). If, on the other hand, if it was determined that there are one or more remote vehicles in the area of interest 60 that may be obstructed or otherwise unseen by the rear vision system 20, then the method proceeds to 152.

Next, step 152 generates a rendering or graphical depiction of the remote vehicle for presentation on the electronic display mirror 34. When the towed object 12 obstructs the field-of-view of the rear facing camera 22 so that the remote vehicle 14 cannot be seen in the area of interest 60, the method gathers information from the remote vehicle via the V2V system 16 and conveys that information to the driver through a rendering or graphical depiction that is shown on the electronic display mirror 34. A non-limiting example of such a rendering is shown in FIG. 3, where the electronic display mirror 34 includes a mirror housing 80 and a video display 82 that shows video from the rear facing camera to the driver in real-time, as well as a rendering or graphical depiction 90 of the unseen vehicle 14. As illustrated, the trailer 12 is blocking or obstructing the camera so that the remote vehicle 14 cannot be seen; however, the rendering 90 is graphically superimposed or laid over the video output so that both the obstructing trailer 12 and the rendering 90 can be seen. The combination of the video output and the rendering is referred to herein as "enhanced video output" and is provided to the electronic display mirror 34 in step 158. It should be appreciated that any number of different renderings, depictions, symbols, designs, graphics, representations, etc. could be used, including basic designs like that of FIG. 3 that are simply a circle or other shape with a corresponding distance to the unseen vehicle, or more complex renderings that are intended to look more like an actual vehicle (not shown).

Step 152 may further use sensor output from the vehicle dynamic sensors 26 (e.g., host vehicle speed, host vehicle position and/or host vehicle heading) in conjunction with traffic output from the V2V unit 24 (e.g., remote vehicle speed, remote vehicle position and/or remote vehicle heading gathered from the BSM) to calculate a separation distance between the host vehicle 10 and the remote vehicle 14 (shown in FIG. 3 as "8 m"). Of course, a numerical distance or range is not the only item that may be displayed with the rendering 90, as time-to-impact, remote vehicle speed and/or any other suitable metric may be displayed, as well as the use of different colors or flashing graphics to convey different values. Such items may be shown in lieu of or in addition to the distance metric illustrated in FIG. 3.

In the event that there are multiple remote vehicles within the area of interest 60, step 152 may select the closest remote vehicle to the host vehicle 10 (e.g., based on GPS coordinates) to be the basis of the rendering or graphical depiction 90. In another embodiment, step 152 may select the closest remote vehicle that is also in the same lane as the host vehicle, even if another remote vehicle is closer but in an adjacent lane. And in yet another embodiment, step 152 may generate multiple renderings and add them to the enhanced video output for presentation on the electronic display mirror 34. Skilled artisans will appreciate that there are myriad techniques for determining which remote vehicle to select, any of which may be used by the present method. Any combination of the camera 22, V2V unit 24, control unit 32, or electronic display mirror 34 may be used to partially or wholly carry out steps 152, 158. For example, the combining or joining of the rendering and the video output to form enhanced video output could be carried out at camera 22, at the V2V unit 24, at the control unit 32, at the electronic display mirror 34, at some other device, or at some combination thereof.

One potential advantage of the present method is that it can generally be implemented without the need for any costly additional hardware for vehicles that are already equipped with rear facing cameras, vehicle-to-vehicle (V2V) units, and electronic display mirrors. Put differently, it may be possible to implement the present method on certain vehicles as a software only modification, which can save a great deal of cost and effort. In addition, the present system and method may provide some degree of redundancy in the event that the host vehicle is not towing a trailer and the rear vision system experiences a malfunction; in such a case, a rendering of one or more remote vehicles may still be able to be shown in the electronic display mirror. It is also possible that the system and method described herein can provide a driver with some assistance when they are backing up the host vehicle and trailer, as unseen vehicles transmitting BSMs could potentially be avoided.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of using a rear vision system for a host vehicle, the rear vision system includes a rear facing camera, a vehicle-to-vehicle (V2V) unit, and an electronic display mirror, and the method comprises the steps of:
determining if a towed object behind the host vehicle is obstructing the rear facing camera;
identifying an area of interest behind the host vehicle when the rear facing camera is obstructed;
gathering information from a remote vehicle with the V2V unit;
using the gathered information to determine if the remote vehicle is in the area of interest;
generating a rendering of the remote vehicle when the remote vehicle is in the area of interest; and
displaying video output and the rendering of the remote vehicle on the electronic display mirror in the form of enhanced video output.

2. The method of claim 1, wherein the determining step further comprises determining if the towed object is obstructing the rear facing camera by using an image processing technique to analyze an image taken from the video output and to identify the towed object from the image.

3. The method of claim 2, wherein the image processing technique includes the use of a multi-stage algorithm that identifies a plurality of edges in the image taken from the video output and associates the plurality of edges with the towed object.

4. The method of claim 3, wherein the multi-stage algorithm includes the sub-steps: storing a first image taken from the video output, applying one or more filters to the first stored image to obtain a first filtered image, identifying a first plurality of edges from the first filtered image, waiting a predetermined period of time and repeating the preceding sub-steps on a second image taken from the video output so that a second plurality of edges is identified, evaluating the first and second pluralities of edges and determining if they are consistent, and determining that the towed object is obstructing the rear facing camera when there is sufficient consistency between the first and second pluralities of edges.

5. The method of claim 4, wherein the sub-step of applying one or more filters to the first stored image includes the use of a Canny filter, a Histogram of Oriented Gradients (HOG) filter, or both.

6. The method of claim 3, wherein the multi-stage algorithm includes the sub-step: determining an obstruction angle α that is based on a geometric relationship between the rear facing camera and at least one of the plurality of edges.

7. The method of claim 1, wherein the identifying step further comprises identifying the area of interest behind the host vehicle by obtaining a host vehicle position from a navigation unit and at least partially defining the area of interest based on the host vehicle position.

8. The method of claim 7, wherein a boundary of the area of interest forms a polygon and includes a pair of first ends that are joined by a vertex having an angle α that is representative of an obstruction angle caused by the towed object.

9. The method of claim 7, wherein a boundary of the area of interest includes a first end and a second end which are separated from one another by a length X that is between 50 m and 200 m.

10. The method of claim 7, wherein a boundary of the area of interest includes a first side and a second side which are separated from one another by a width Y that is between 5 m and 20 m.

11. The method of claim 7, wherein the area of interest is at least partially defined by a size and/or shape of the towed object.

12. The method of claim 1, wherein the gathering step further comprises gathering information with the V2V unit by receiving a basic safety message (BSM) from the remote vehicle and extracting from the BSM at least one piece of information selected from the group consisting of: a remote vehicle position, a remote vehicle speed, or a remote vehicle heading.

13. The method of claim 12, wherein the using step further comprises using the gathered information to determine if the remote vehicle is within the area of interest by comparing the vehicle position of the remote vehicle to a boundary of the area of interest.

14. The method of claim 1, wherein the generating step further comprises generating the rendering of the remote vehicle and adding the rendering to the video output from the rear facing camera by graphically superimposing the rendering over the video output to form enhanced video output, and the displaying step further comprises displaying the enhanced video output on the electronic display mirror in real time.

15. The method of claim 14, wherein the rendering of the remote vehicle includes a basic shape representing the remote vehicle and at least one metric selected from the group consisting of: a distance from the host vehicle to the remote vehicle, a remote vehicle time-to-impact, or a remote vehicle speed.

16. The method of claim 14, wherein the rendering of the remote vehicle includes a graphic depiction representing the remote vehicle that changes color depending on how close the remote vehicle is to the host vehicle.

17. The method of claim 14, wherein the generating step further comprises selecting a closest remote vehicle from a plurality of remote vehicles, generating the rendering of the closest remote vehicle, and adding the rendering of the closest remote vehicle to the video output from the rear facing camera to form enhanced video output when the plurality of remote vehicles are in the area of interest.

18. A rear vision system for use with a host vehicle, comprising:
a rear vision system control unit that includes an electronic memory device and an electronic processing device;
a rear facing camera that is coupled to the rear vision system control unit and provides the rear vision system control unit with video output of an area behind the host vehicle;

a vehicle-to-vehicle (V2V) unit that is coupled to the rear vision system control unit and provides the rear vision system control unit with traffic output relating to one or more remote vehicles; and an electronic display mirror that is coupled to the rear vision system control unit and receives enhanced video output from the rear vision system control unit;

wherein the rear vision system control unit is configured to: electronically process the traffic output from the V2V unit to determine if a remote vehicle is in the area behind the host vehicle, generate a rendering of an obstructed vehicle when the remote vehicle is in the area behind the host vehicle, add the rendering of the obstructed vehicle to the video output from the rear facing camera so as to create the enhanced video output, and provide the enhanced video output to the electronic display mirror so that the electronic display mirror displays the enhanced video output.

* * * * *